(12) United States Patent  
Nieswand et al.

(10) Patent No.: US 6,520,407 B1  
(45) Date of Patent: Feb. 18, 2003

(54) METHOD AND SYSTEM FOR RECOGNIZING ROUTING INFORMATION ON LETTERS AND PARCELS

(75) Inventors: Benno Nieswand, Constance (DE); Jürgen Zehren, Meersburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/530,651

(22) PCT Filed: Aug. 26, 1998

(86) PCT No.: PCT/DE98/02512  
§ 371 (c)(1), (2), (4) Date: May 3, 2000

(87) PCT Pub. No.: WO99/22883  
PCT Pub. Date: May 14, 1999

(30) Foreign Application Priority Data

Nov. 4, 1997 (DE) .......................... 197 48 702

(51) Int. Cl.⁷ .............................................. G06F 17/00
(52) U.S. Cl. ...................... 235/375; 235/376; 235/385
(58) Field of Search .................... 235/375, 376, 235/383, 385, 454, 462.01, 462.14

(56) References Cited

U.S. PATENT DOCUMENTS

| 4,992,649 A | | 2/1991 | Mampe | |
|---|---|---|---|---|
| 5,031,223 A | * | 7/1991 | Rosenbaum et al. | 209/900 |
| 5,387,783 A | * | 2/1995 | Mihm et al. | 235/375 |
| 5,446,667 A | * | 8/1995 | Oh et al. | 363/464.02 |
| 5,917,925 A | * | 6/1999 | Moore | 383/101 |
| 6,156,988 A | * | 12/2000 | Baker | 209/584 |

FOREIGN PATENT DOCUMENTS

| DE | 43 24 255 A1 | 1/1995 |
|---|---|---|
| EP | 0 148 783 A1 | 7/1985 |
| EP | 0 584 607 A2 | 3/1994 |
| EP | 0 589 119 A1 | 3/1994 |
| EP | 0 726 540 A2 | 8/1996 |
| EP | 0 755 728 A2 | 1/1997 |

* cited by examiner

*Primary Examiner*—Thien M. Le  
*Assistant Examiner*—Daniel St. Cyr  
(74) *Attorney, Agent, or Firm*—Norman N. Kunitz; Venable

(57) ABSTRACT

The invention relates to the recognition of routing information on mail items with the aid of automatic OCR readers and video coding. For a fast and inexpensive reading in the case of unclear results in one the automatic OCR process steps, this step is arrested in the current state. With the aid of the previously determined clear and unclear results/intermediate results, a video coding job is automatically transmitted to one or several video coding stations, along with the presently available results and the operations to be carried out for obtaining clear results for this process step. With the clear video coding results, which replace the unclear results, the paused OCR process step is successfully completed and the following process step is started.

11 Claims, 14 Drawing Sheets

METHOD AND SYSTEM FOR RECOGNIZING ROUTING INFORMATION ON LETTERS AND PARCELS

BACKGROUND OF THE INVENTION

The invention relates to a method and a system for recognizing routing information on mail items.

When sorting/routing mail items, not all machine-processed mail items can be processed completely automatically. The reasons for this are numerous and range from address units that are not found to contradictions in the read address, which cannot be solved by the equipment. In those cases, the electronic reading devices are forced to stop the processing operation, without being able to provide a final result.

Presently known solutions for an integrated processing of mail items are based on the principle of a 2-stage processing, which functions as follows when simplified.

Stage 1

The scanner provides the electronic reading devices with a non-condensed binary/gray image and attempts to process the mail item completely. In the process, the following steps can be realized.
ROI—recognizing regions of possibly relevant information
Separation of lines in a region
Recognition of characters and word separation
Address interpretation with address analysis—assigning possible meanings to a word
Address correlation—decision for a meaning and determination of the sorting result based on the comparison results with reference data (dictionary)

In the process, alternative meanings are obtained for all processing steps. However, the processing is stopped permanently if no result is achieved in one of the steps or several results are obtained with the same probability, so that no clear meaning can be determined in the end.

The mail item is sent as reject to the machine control, which then issues a command for further processing to the video coding system.

Stage 2

The video-coding system is provided with a condensed binary image at the same time as the electronic reading devices, or following a rejection, and also attempts to process the mail item completely after a command is issued by the machine control. In that case, partial results from the electronic reading device can be taken into account. A uniform coding flow is a necessary precondition, especially with a multi-stage coding of all relevant address components, so as to achieve a high throughput for each coding station. Minimizing the coding expenditure for each mail item by using the partial results is only conditionally possible since the resulting plurality of entry points for the coding interferes with the uniformity. The processing follows the motto:

"Coding is faster than thinking!"

Thus, the practice of entering unnecessary information instead of limiting the coding device to the input of the minimally needed information by means of extensive user guidance is taken into account. As a result the online capacity is also restricted owing to the necessary coding time (U.S. Pat. No. 4,632,252).

The mechanical delay loop length in the sorting machine is critical for the separation into online and off-line processing. Basically, 2 different systems are offered.

1. Machines with a short delay loop (approx. 4-5 seconds) process the mail items online only by means of an electronic reading device. The downstream-connected coding system is operated off-line (U.S. Pat. No. 4,992,649).

Machines with longer delay loops can additionally process a portion of the mail items online in the coding system (German Patent 43 24 255).

A further disadvantage is the high demand level on the capabilities of the video coding forces.

SUMMARY OF THE INVENTION

The invention is based on the problem definition of reading the routing information on the surface of mail items as quickly as possible using automatic OCR reading devices and video coding stations while making low demands on the video coding forces.

Less is required of the video coding forces, owing to the fact that the automatic OCR processing unit does not stop the image processing following an unclear result in one of the processing steps. Instead, it changes over to a standby condition and a job is generated for a video coding station to provide a clear solution for this step, which includes the information on the operations to be carried out. In addition, the processing speed of the complete reading process increases, so that the share of online processed mail items increases if respective intermediate storage areas exist. Advantageous embodiments of the invention are specified in the dependent claims.

Owing to the fact that the task is displayed on the video coding station monitor and the video coding stations are divided into different job categories according to a feature of the invention, a particularly rapid coding with very low coding requirements results.

According to a further feature, the jobs for the video coding stations are generated advantageously by job formulators, which search for the unclear results/intermediate results in the context memory of the OCR processing unit, then formulate corresponding jobs for a clear solution of these reading problems and transmit these to the video coding stations to be displayed on the monitors.

Further advantageous embodiments provide for response processors, which insert the data from the video coding stations into the context memory, delete unclear results and transmit a signal for continuing the reading process to the OCR processing unit.

It is furthermore advantageous to provide a job distributor at the entrance to the video coding device, which distributes the incoming coding jobs in accordance with task responsibilities stored in a coding station data bank and distributes workload messages from the video coding stations to these. For a particularly fast and effective operating mode, it is advantageous according to claim 10 to install a fast, automatic online routing information reader upstream of the arrangement according to the invention. If this reader does not read the routing information within a predetermined, short time interval, the respective images are forwarded to the arrangement according to the invention.

Finally, it is also advantageous if several images are processed in parallel.

The invention is explained in the following with an exemplary embodiment and with the aid of the drawings.

DESCRIPTION OF THE PREFERRED EMBODIMENTS

Following the scanning, the image of a mail item to be processed is sent to the automatic reader. For this, it is advantageous for reasons of predicting the system behavior to give the job initially to a rapid automatic online reader as primary reader, which attempts to process the mail item without interaction or interruption. With this, a result is achieved with certainty during the time in which the mail item remains in the machine, so that an immediate distribution based on this result can take place. Should this reading attempt fail, the image of the mail item is transmitted to the arrangement according to the invention with an OCR processing unit 11, which can use the remaining machine time as well as determine completely independent of this a distribution result for a further machine run. This OCR processing unit 11 comprises various functional groups for processing the mail item, in part parallel and in part sequential. In this example, a mail item is coded for delivery to the recipient. At the same time, the validity of a stamp is to be recognized. In the following, the sequential operations in and between the components of the arrangement according to the invention are described. The components communicate by way of a socket interface that is provided by the operating system and makes it possible to connect the individual units optionally to one computer or different computers, which are connected via Ethernet.

The OCR processing unit 11 attempts to process the mail item completely. In the process, various processing steps are normally completed either linear or in part also cyclically.

In principle, each of these processing steps must solve specific problems to reach a clear result and is therefore a candidate for processing supported by video coding. The problems that occur are the same as those previously described in the description of the prior art.

Figure 1:
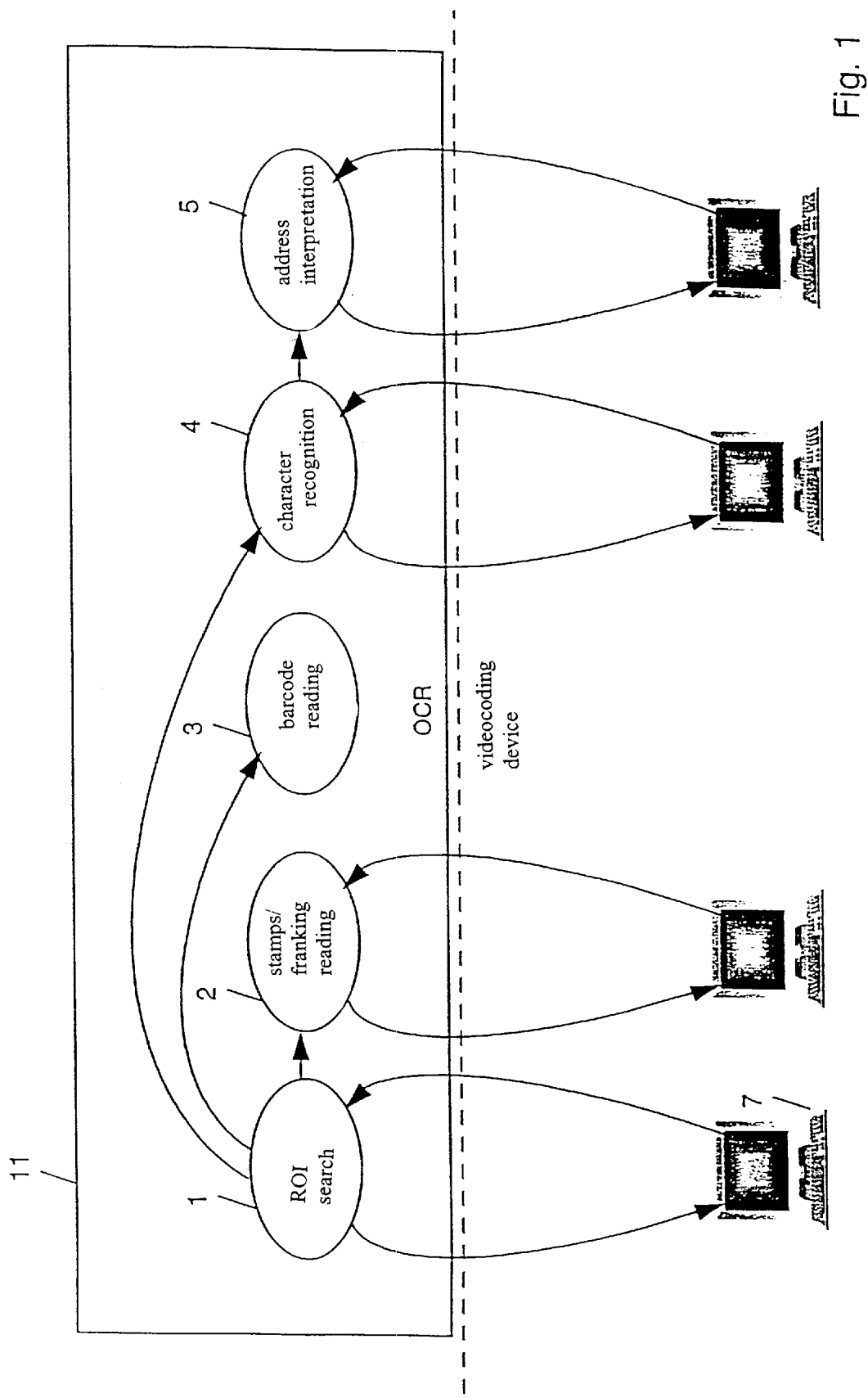
FIG. 1 shows the processing steps for reading the routing information according to the method of the invention.

FIG. 1 represents the various processing steps in the OCR processing unit 11 and the resulting coding steps. In the process, steps that can be processed independent of each other are run parallel while steps that build on each other are run sequential.

Figure 2:
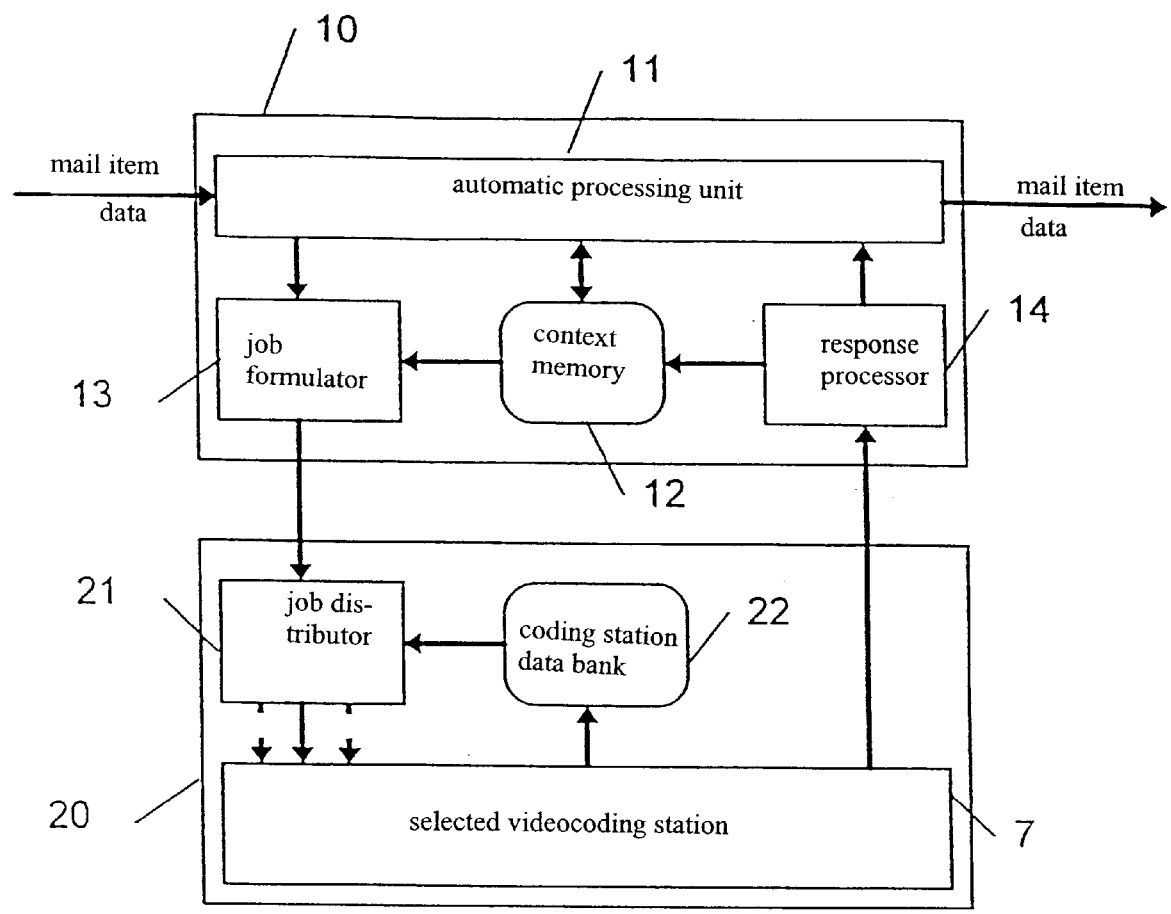
FIG. 2 is a wiring diagram for explaining the sequence according to the invention.

According to FIG. 2, the mail item data are accepted from the automatic OCR processing unit 11 and are processed according to the problem definition to be solved at that instant, in accordance with the processing chain explained in FIG. 1. In the process, a mail item context is assembled from the input data and the partial results/results that are available and this context is stored in the context memory 12. In the event that the partial results cannot be reduced to a clear final result, the OCR processing unit 11 initially has failed in its task. In this condition, the OCR processing unit 11 interrupts its recognition and interpretation process and remains in its processing context. For this, the standard mechanisms of a modern multitask operating system are used.

A job formulator 13 evaluates the mail item context and formulates a job for video-coding device 20 for solving the task from the resulting data. A job is thus formulated and sent to the video-coding device 20, consisting of the mail item image or image segments, the corresponding attribute data and an operation to be carried out.

At the input of video-coding device 20, a job distributor 21 is always ready to accept incoming jobs. The jobs are analyzed with respect to the operation to be carried out and a suitable coding station 7 for solving the task is selected from the pool of available coding stations 7. Critical for the selection are the workload situation and the coding mode of a workstation. If a suitable coding station 7 is not available, a job rejection is sent back to a response processor 14. The selected coding station 7 is provided with the job data and presents the image of the mail item on a high-resolution monitor to the coder, which performs the required coding action. The result is then sent back to the response processor 14. The latter inserts the response data into the mail item context, deletes the unclear data and ensures that the recognition and interpretation process in the OCR processing unit 11 continues.

The coding tasks essentially include the following operations:

Confirmation
The coder is asked to confirm a result recognized by the automatic reader. Frequently, results are correctly identified by the reader, but must be ignored because of the error rate to be guaranteed and the computed probability for the correct recognition. A quick confirmation by the coder means that these recognition results are no longer rejected, but can even be used for sorting during the online times.

Selection
The coder selects between several alternatives, which were determined as options during the automatic recognition process. Following this, the automatic recognition process is continued with the feedback from this decision aid. The most varied objects can be selected, from a partial string, alternative regions of interest (ROI), up to the alternatives from an address bank.

Keying
The coder inputs extracts or full strings of the address components, marked by the OCR processing unit 11. The OCR processing unit 11 uses the input data to supplement or improve the correlation during the recognition of these address components.

Manual ROI

The coder selects the necessary regions of interest (ROI), e.g. the address label of the recipient, from an overall image of the mail item (large letters and packages) by using a grid method or a touch-screen. Subsequently, the OCR processing unit 11 superimposes its recognition task anew onto the manually determined ROI.

All operations are simple and generic and contain hardly any country specific information, which considerably reduces client-specific adaptations. Starting with its curent context, the OCR processing unit 11 can request video-coding support and thus ideally supplement its recognition process with video-coding help. In order to increase the efficiency of the reading and video coding system, several recognition processes are always running parallel. In order to improve ergonomics and reduce the coding times, the various coding tasks can be distributed optionally to different coding stations. The advantages of this interactive, integrated reading and video coding method can be summarized as follows:

Simple, generic coding strategies and coding rules considerably simplify the learning process for the video coder, in particular with complex address structures or a high coding depth.

The demands on the capabilities of the coding forces are strongly reduced. The same is particularly true for complex address structures and/or a high coding depth (e.g. for the delivery sequence sorting or the integrated forwarding).

The optimum support of the automatic reading process again increases the online coding rate and the efficiency of the reading and coding system.

In the following, the operating mode is explained in further detail by using processing steps selected with the aid of coding tasks.

Address, which cannot be Detected Automatically

On large mail items in particular, it frequently happens that the scanned-in image, for example of a magazine, contains a wealth of additional data resembling an address unit in addition to the pasted-on label with the recipient's address. In those cases, the address block search frequently fails completely or finds the correct address only through computer-intensive parallel verification of many candidates which, however, frequently leads to an exceeding of the online processing time.

The OCR processing unit 11 will initially attempt to identify the recipient address block.

a) If the discovered characteristics are not sufficient for a clear or variant-poor determination, this process step is paused and the following processing initiated:

A job for the video coding station 20 is formulated with the following data:

Mail item image, including picture attributes according to the TIFF specification;

Coordinate description for all image regions in question;

Determining the type of request, which in this case: is a request for selection of an image region for the recipient determination.

A job distributor 21 of the video-coding device 20 selects a suitable and available coding station 7.

The coding station 7 displays the image of the mail item and processes the request.

The result of the data input by the coder is sent back to the requesting OCR processing unit 11. After receiving the response, the mail item processing at the previously paused station is picked up again.

b) If the discovered features are not sufficient for the determination, the context of this mail item processing is paused and the following processing is initiated:

A request to the video-coding device 20 is formulated with the following data:

A mail item image, including the picture attributes according to TIFF specification Determining the type of request, which in this case is:

A request for inputting a picture region for determining the recipient.

The job distributor 21 of the video-coding device 20 selects a suitable and available coding station 7.

The coding station 7 displays the image of the mail item and processes the request.

The result of the coding input is sent back to the requesting OCR processing unit 11.

After receiving the response, the mail item processing at the previously paused station is picked up again.

In many cases, the probability of a subsequent, fully automatic processing of the address block is very high, particularly when making available the correct address block through a video-coding device, since nearly all address labels on large items are printed on by a machine.

Address with Insufficient Reliability

In particular with business addresses, it frequently happens that a recipient address is clear in principle, but that the result of the automatic comparison is discarded since the type of writing does not correlate with sufficient reliability with any address that can be found in the address data bank.

The OCR processing unit 11 will initially attempt to read the recipient address block.

If the discovered characteristics are not sufficient to achieve the required reliability, this processing step is paused and the following processing is initiated:

A job for the video-coding device 20 is formulated with the following data:

A mail item image, including the picture attributes according to TIFF specification Complete address of the recipient Determining the type of request, which in this case is: a request for confirming the recipient address.

The job distributor 21 of the video-coding device 20 selects a suitable and available coding station 7.

The coding station 7 displays the image of the mail item and processes the request.

The result of the coding input is sent back to the requesting OCR processing unit 11.

After the response is received, the mail item processing at the previously paused station is picked up again.

The processing is normally completed with this.

Mail Item with Unreadable Address

In particular in the area of recognizing handwriting, the presently available level of technology frequently does not permit the fully automatic reading of addresses.

The OCR processing unit 11 will first attempt to read the address block of the recipient. If the characteristics found at one point of the processing are not sufficient for a further processing, this processing step is paused and the following processing steps are initiated:

A job for the video-coding device 20 is formulated with the following data:

Image of the mail item, including picture attributes according to TIFF specification Description of coordinates for the image region for which no processing is possible.

Determining the type of request, which in this case is:
A request for inputting the address component described by the coordinates.

The job distributor 21 of the video-coding device 20 selects a suitable and available coding station 7.

The coding station 7 displays the image of the mail item and processes the request.

The result of the coding input is sent back to the requesting OCR processing unit 11.

After receiving the response, the mail item processing at the previously paused location is picked up again.

In many cases, the automatic processing up to a complete result is made possible by closing a gap. If this is not the case, said step can be repeated as often as desired for a mail item.

The operational steps for specific reading sequences are explained in further detail in the following:

Regional Search

At the start of the processing is always the selection of relevant regions of interest (ROI), which analyzes the complete image as to geometric and color characteristic regions and from this initially forms hypotheses with respect to their meaning. During the processing, the hypotheses, consisting of:

Coordinate values that describe the position and size of the characteristic region
X/Y value pair in the left lower corner
X/Y value pair in the left upper corner
X/Y value pair in the right lower corner
X/Y value pair in the right upper corner Hypotheses concerning the meaning (e.g. recipient address block, free stamp, sender address block) are stored in a data bank, which in the following is referred to as mail item context.

If the result is not clear, the function group 1 of the OCR processing unit 11, which is responsible for the regional search, induces the job formulator 13 to issue a job for a clear coding to the video-coding device 20. The function group 1 itself enters a waiting position, relative to this mail item, until the result from the video coding has been received. However, as a result of the options for running parallel operations, offered by modem operating systems, the processing of the following mail item is started.

Figure 3:
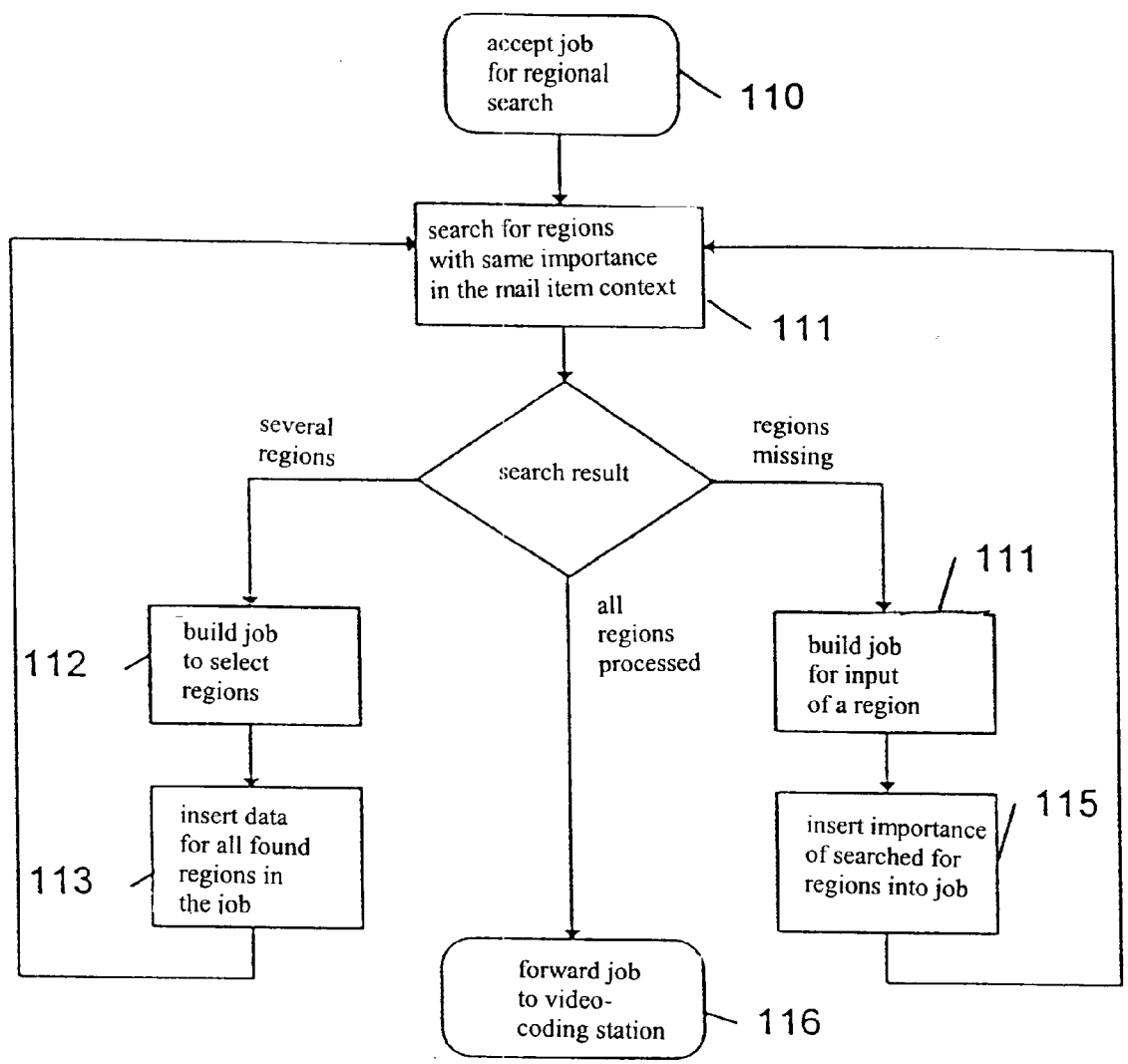
FIG. 3 is a flow chart for a job-formulating device during the regional search.

FIG. 3 describes the operating mode of the job formulator 13, which searches the context memory 12 for ambiguous or non-existing regions until only unambiguous regions remain, which thus must not be processed.

Following acceptance of the regional search 110, the search for ambiguous or non-detected regions 111 takes place. If regions with identical meaning are found, a corresponding selection job 112 is formulated and the data for the detected, corresponding regions are inserted 113. If no regions are detected, a job 114 for the input of a region with the searched-for meaning 115 is formulated. If all regions have been processed, a job 116 is conveyed to the video-coding device 20.

If one assumes that the stamp has been detected clearly but that different image regions with information exist, which are similar to the form of a recipient address, then the job formulator 13 will transmit exactly this request to the video-coding device 20.

The job distributor 21 is the receiving station in the video-coding device 20. This station does not analyze the complete job, but must determine the type of job in order to select from the coding station data bank 22 of all presently available video coding stations 7 the station with an operator having the necessary ability for solving this task. The task is highly important to the efficiency of this method since each coder must be supplied with enough coding jobs to avoid unnecessary operating pauses.

Figure 4:
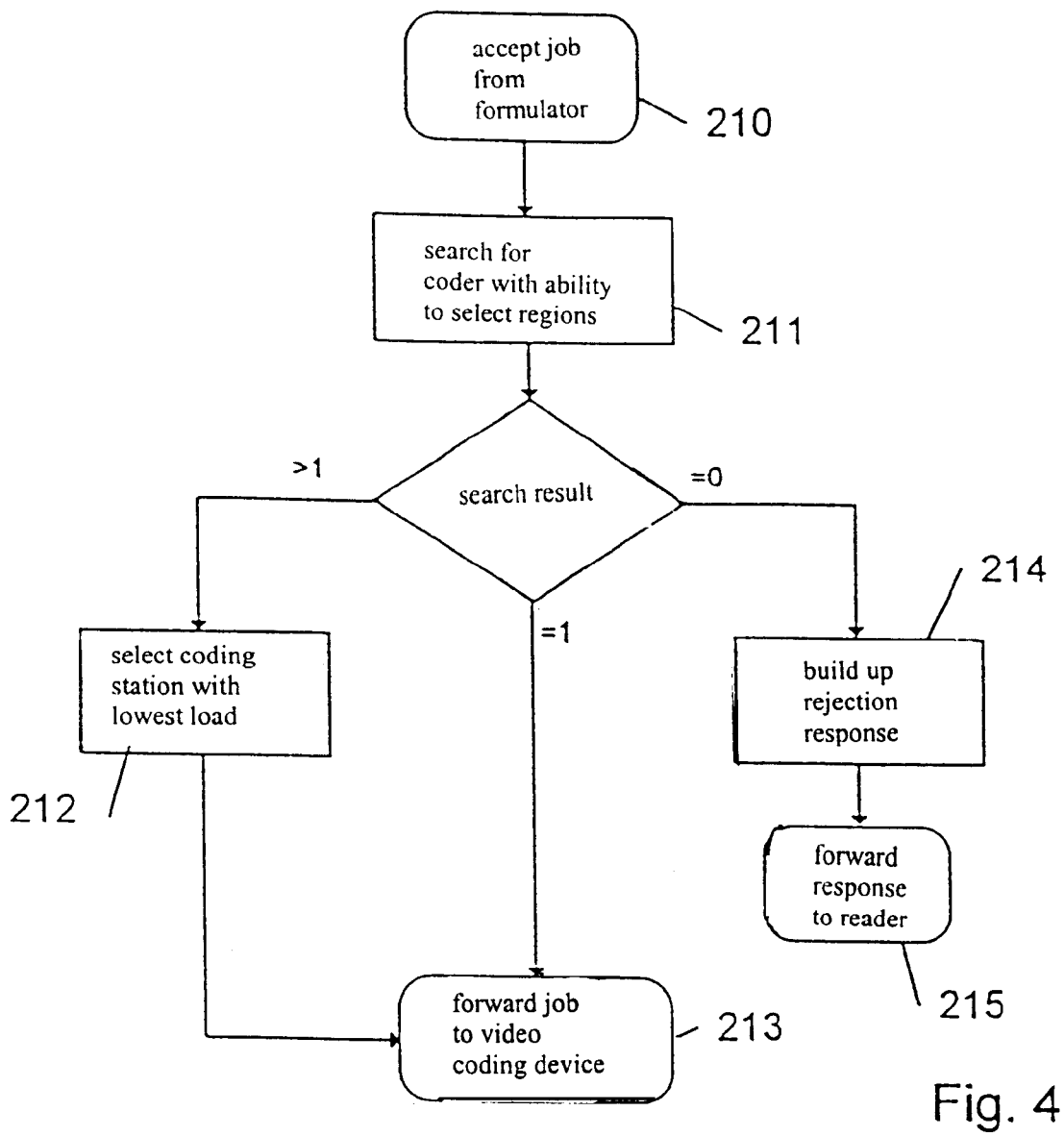
FIG. 4 is a flow chart for a job distributor during the regional search.

FIG. 4 describes the operating mode of the job distributor 21.

The processing time is extended if no suitable coding station can be found, in particular for small coding stations with strongly diversified coding tasks, since the processing in the reader is interrupted in that case. The processing is resumed at a later point in time when suitable coding stations are once more available.

Figure 5:
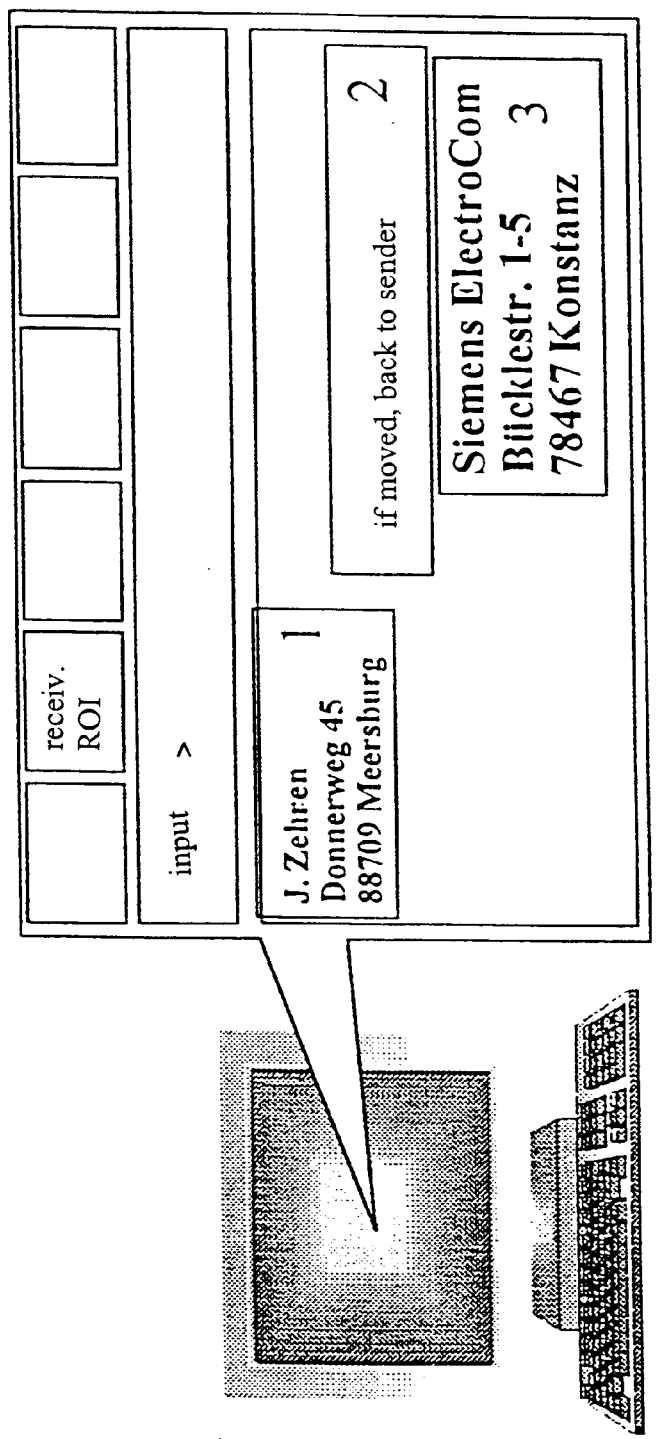
FIG. 5 is a representation of the job for a regional search on the monitor.

The coding process itself must be designed to be as ergonomic as possible. FIG. 5 shows the graphic processing of data at the coding station. The selection takes place via the number unit, so that the coding device can also take on other keyboard-connected coding tasks.

The result of the input by the coder, the number for the region, is used to send the data for this region as result back to the OCR processing unit 11. If the request contains regions with different meaning, these are combined according to their meaning and processed during several steps.

Figure 6:
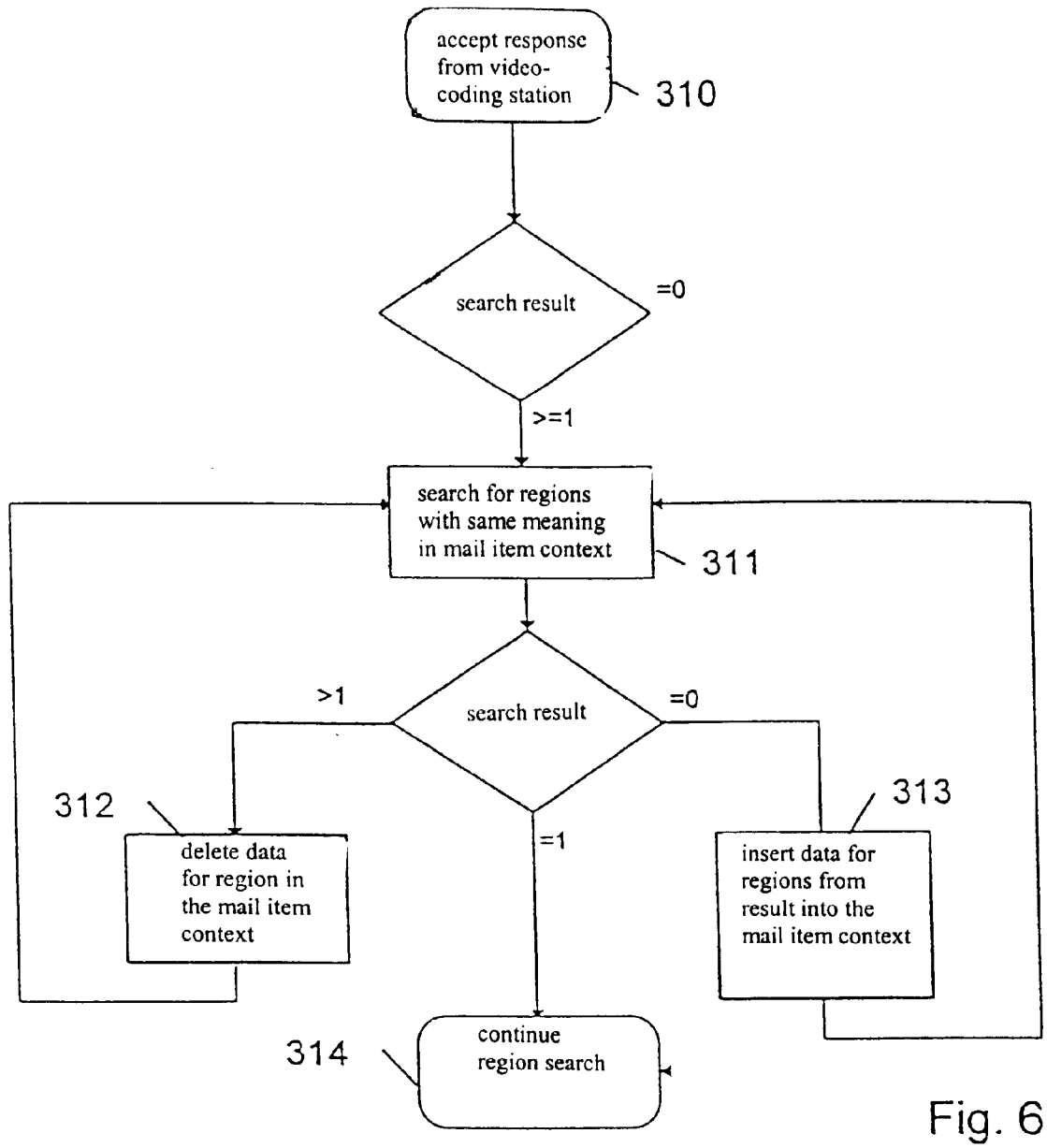
FIG. 6 is a flow chart for a response processor during the regional search.

The response processor 14 for the regional search deletes the ambiguous regions in the mail item context and inserts the result regions. Thus, a clear result is available for each of the regions to be processed. The flow chart shown in FIG. 6 describes the operating mode of the response processor 14. Following acceptance 310 of the response from the video-coding device 20, a check is made to see whether regions were determined as result of the search. If that is not the case, the regional search is continued 314 in the OCR processing unit 11, wherein the processing is then stopped. If the regional search in the video-coding device 20 was successful, the context memory 12 is checked for the existence of corresponding regions with the same meaning. If so, the data 312 are deleted. If the context memory no longer contains data on this region, the data from the video coding are inserted 313 into the context memory 12.

Following a resumption of the processing through the regional search, the mail item context is forwarded as usual to the following processing unit(s). For this example, it concerns the stamp recognition as well as the character processing (OCR) since these two units do not depend on the results from the respectively other unit.

The stamp recognition in this case can function without further coding interaction since the stamp is either clear enough, so that it can be clearly identified by its shape, or is smudged enough so that an interaction with a video coding station does not essentially improve the result.

The character processing, which recognizes individual characters, groups these into words and assigns these words to individual lines, also generates many alternatives. The data (characters) are stored with all possible links to words and lines in the mail item context.

The information generated in the process, however, is too voluminous for the Roman language to allow an ergonomic processing, so that it is not further considered here. However, it is conceivable to integrate an interaction for languages based on word alphabets or syllable alphabets (e.g. Chinese).

The character processing output forwards the mail item context to the address interpretation.

Address Interpretation

This processing unit attempts to detect the importance of the individual words and to construct from this a consistent address, to which a clear routing information can be assigned.

In the process, meaning hypotheses are assigned to the individual words in the mail item context, which must complement each other to form a complete, syntactically correct address.

Figure 7:
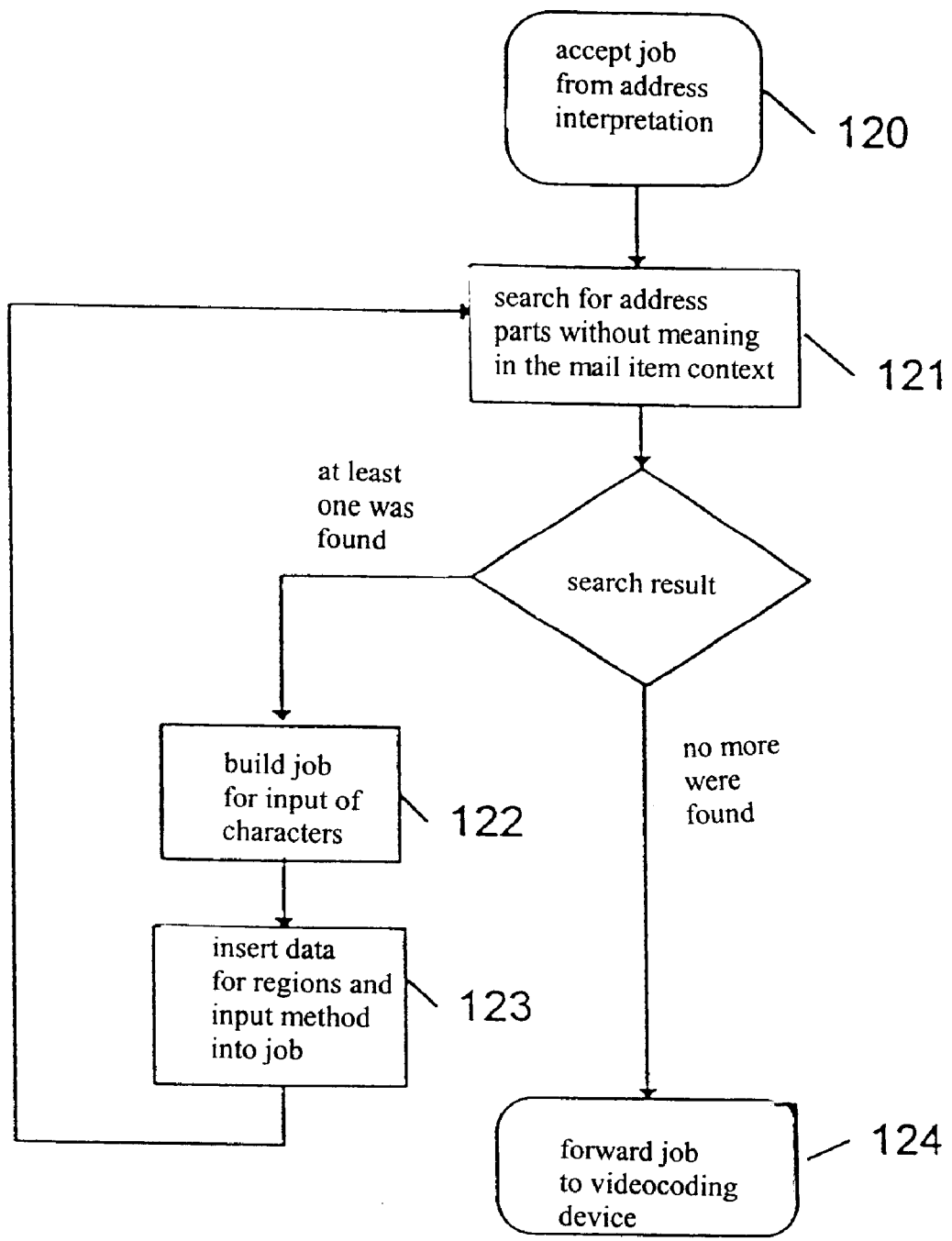
FIG. 7 is a flow chart for a job formulator for address components detected with an incomplete and unclear meaning in the character recognition and address analysis.

The resulting address variants are compared with the aid of a data bank containing all relevant addresses. The address variants are obtained through iteration over the course of several steps, during which respectively individual address components are processed (e.g. postal code and city). If no clear meaning can be assigned to individual words in the address, the address interpretation calls up a job formulator 13, which searches the mail item context for address components for which the meaning is unclear because the characters, for example, could not be recognized completely. The operating mode of the job formulator 13 is described in the flow chart in FIG. 7. Following acceptance of the job for the character input 120, a search 121 is conducted in the context memory for address components without a clear meaning. If the search is positive, a job is formulated 122 for the input of the unclear characters, wherein the data for the region and the input method are inserted 123. If all unclear address components have been determined and corresponding jobs formulated, a total job is transmitted 124 to the video-coding device 20.

Figure 8:
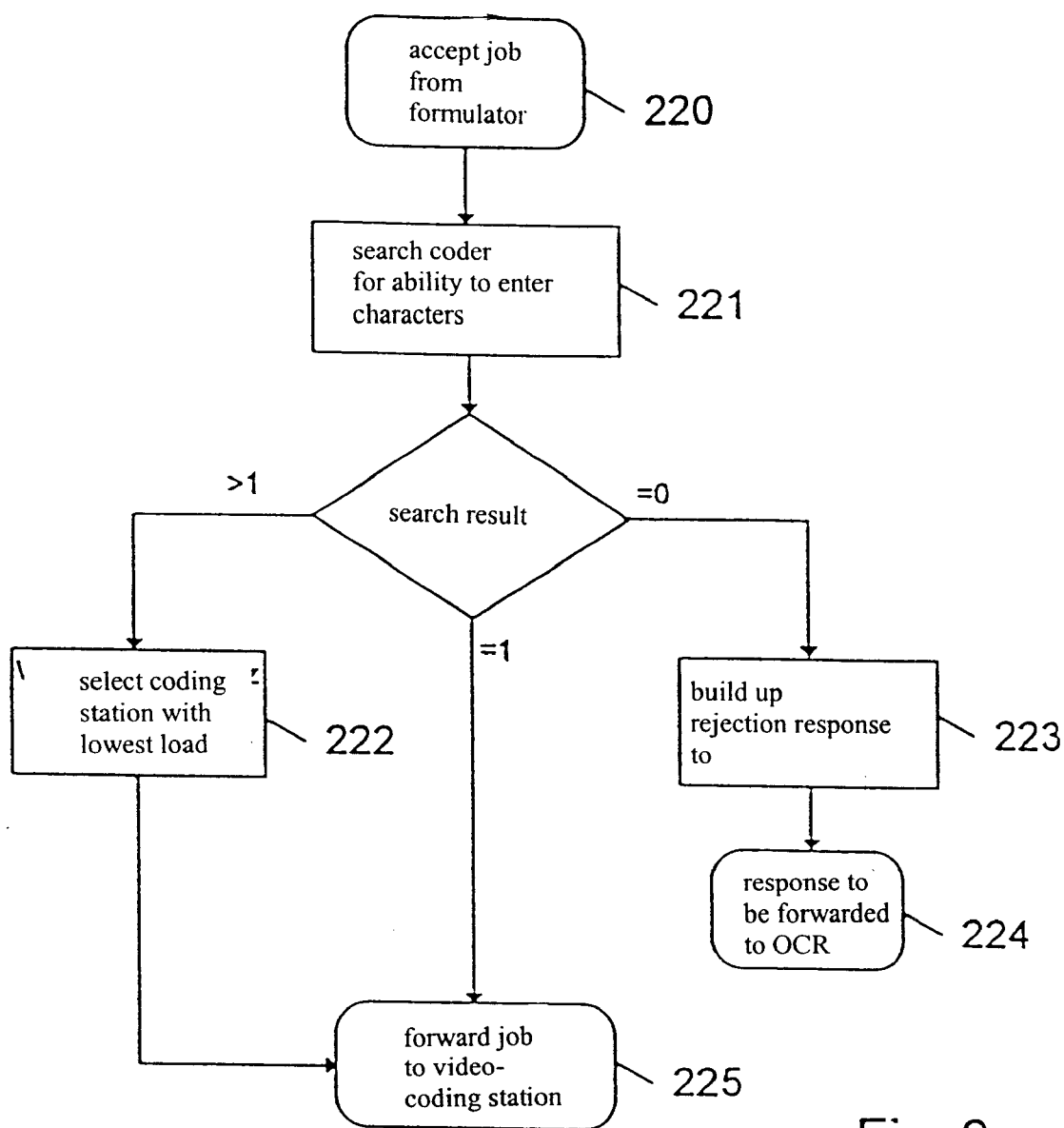
FIG. 8 is a flow chart for a job distributor for address components that are recognized with incomplete and ambiguous meaning.

The receiving station in the video-coding device 20, the job distributor 21, determines the type of job following the job acceptance 220. It then conducts a search 221 of its coding station data bank 22 for the video coding station(s) available, which has an operator with the necessary capability to solve this task and, if several video coding stations are available, to select the station with the lowest load 222. Once the respective video-coding station has been determined, a job is forwarded 225 to this station. If no available video-coding station could be found, a rejection response is formulated 223 and is forwarded 224 to the OCR processing unit 11 (see FIG. 8).

The processing time will be extended if no suitable coding station is found, in particular for small coding systems with strongly diversified coding tasks, since the processing in the reader is stopped in that case and is resumed at a later time, once suitable coding stations are available.

Figure 9:
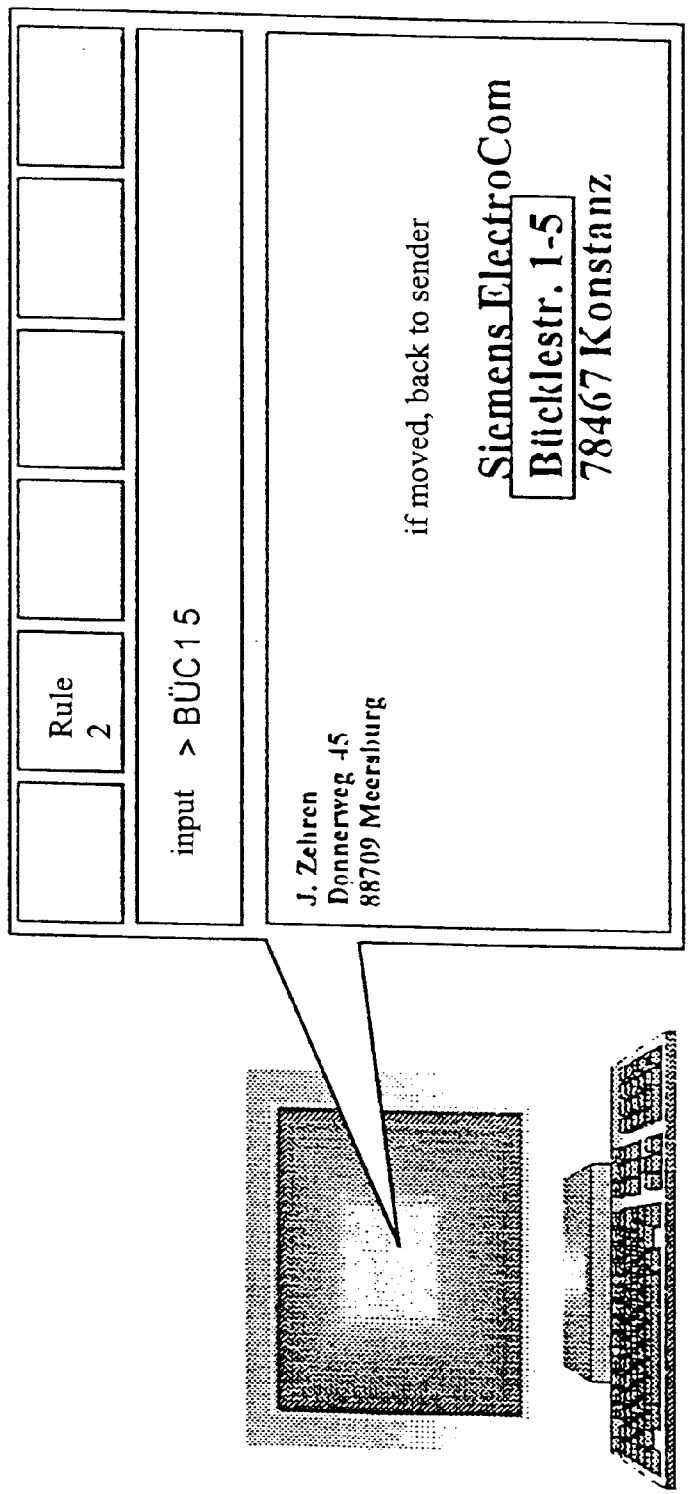
FIG. 9 is a representation of the job for address components that are incomplete and for which the meaning is unclear.

The coding operation itself must be designed to be as ergonomic as possible. FIG. 9 illustrates the graphic processing of data at the coding station. The input is via a standard keyboard. The input method (e.g. the first 3 characters of the first word and the numbers) is determined by the request, since it depends on the method of accessing the data bank used.

The result of this input is sent back to the reader. If the request contains several regions, these are processed during several steps.

The response processor 14 of the address interpretation deletes the ambiguous characters and words of the regions that are not recognized within the mail item context and inserts the characters from the result. Thus, a clear result is available for each region to be processed.

Figure 10:
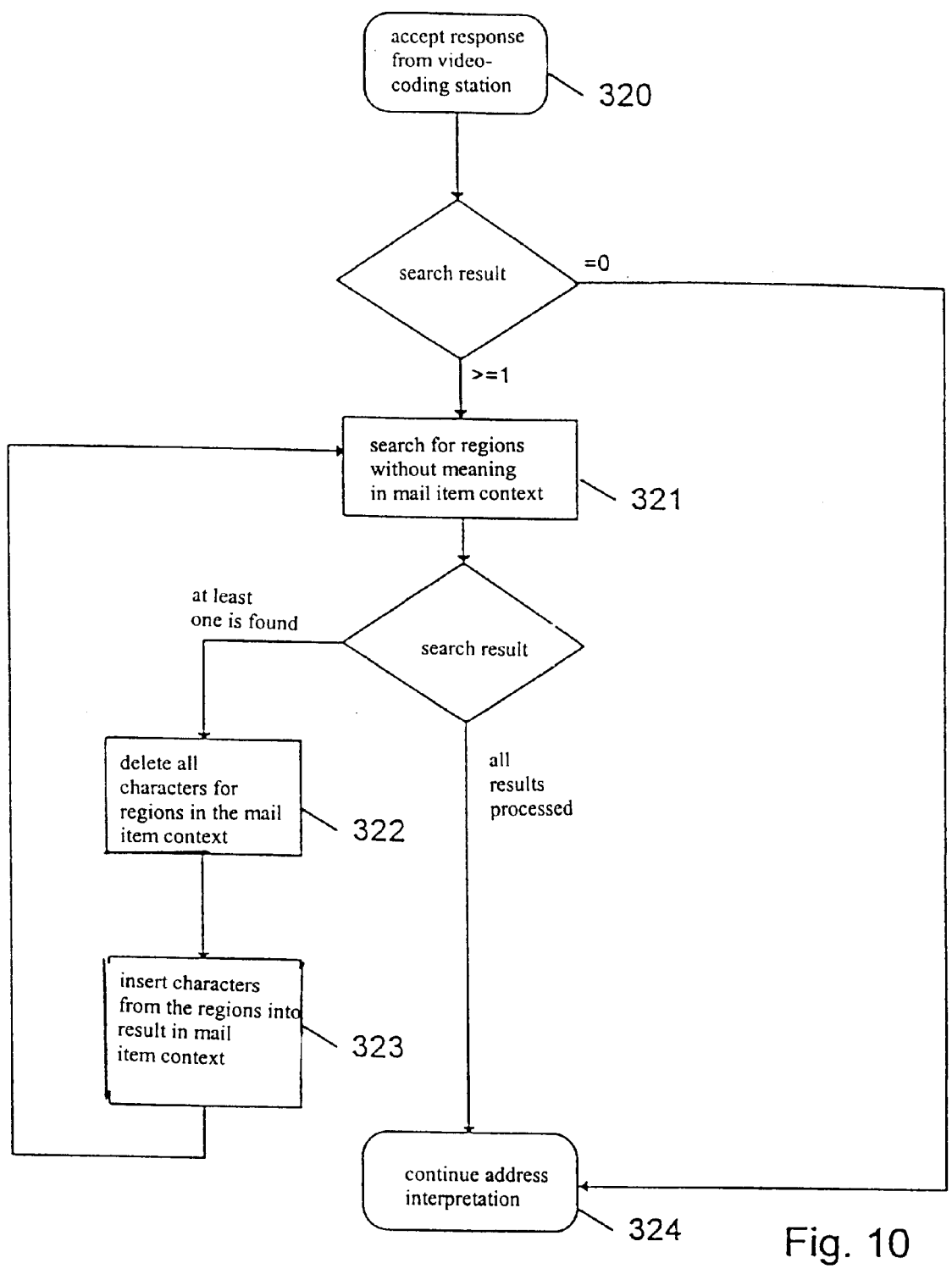
FIG. 10 is a flow chart for a response processor for address components recognized with an incomplete and ambiguous meaning.

The flow chart in FIG. 10 describes the operating mode of response processor 14. Once the response from the video-coding device 20 is accepted 320, a check is made to determine whether a response to the job exists. If that is not the case, the address interpretation is continued 324 in the OCR processing unit and the previous processing is stopped. Once a successful video coding has been carried out, the regions without importance 321 are searched for in the context memory 12. If such regions are found, the corresponding characters are deleted 322, the character data from the video coding are inserted into the mail item context 323 and the address interpretation is continued 324.

If the addresses or the partial addresses cannot be defined clearly after resuming the processing with the address interpretation, a decision-making device searches within the framework of the address interpretation the mail item context for all alternative meanings of a partial address or an address. On the basis of different decision criteria (e.g. the reliability of the individual alternatives, defined error rate), the decision-making device attempts to achieve a clear result or sets up a list of possible candidates. The list of possible candidates, reduced by the decision-making device, is marked and the respective job formulator is given an order.

Figure 11:
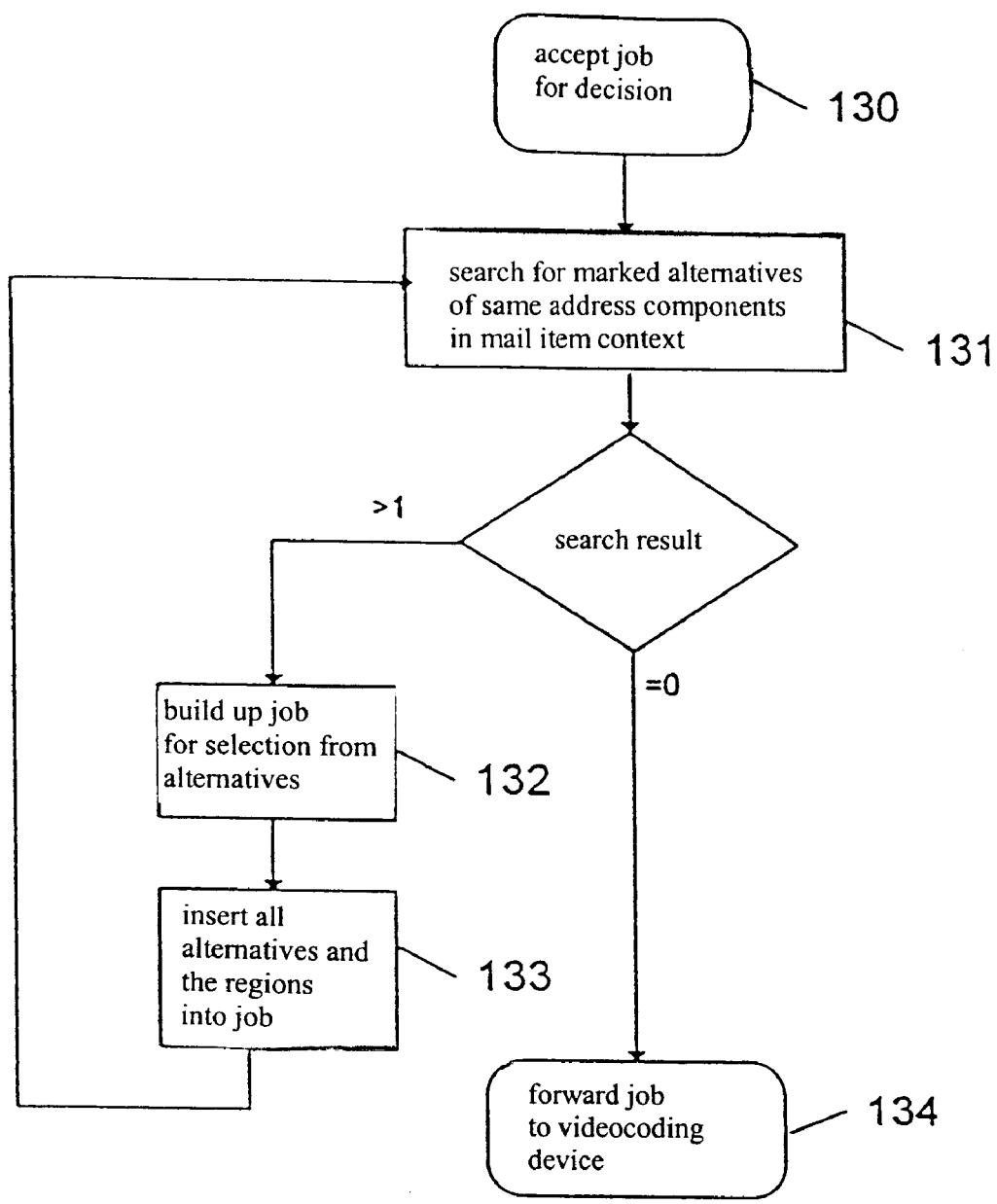
FIG. 11 is a flow chart for a job formulator during the address correlation.

The flow chart in FIG. 11 describes the operating mode of job formulator 13. Following acceptance of the job to make a decision 130 concerning address alternatives, marked alternatives with the same addresses/address components are searched for the in the mail item context 131. If the search is positive, a selection job 132 is formulated. The alternatives and the regions are inserted into the job 133. If all marked alternatives are found, a corresponding job is forwarded 134 to the video-coding device.

Figure 12:
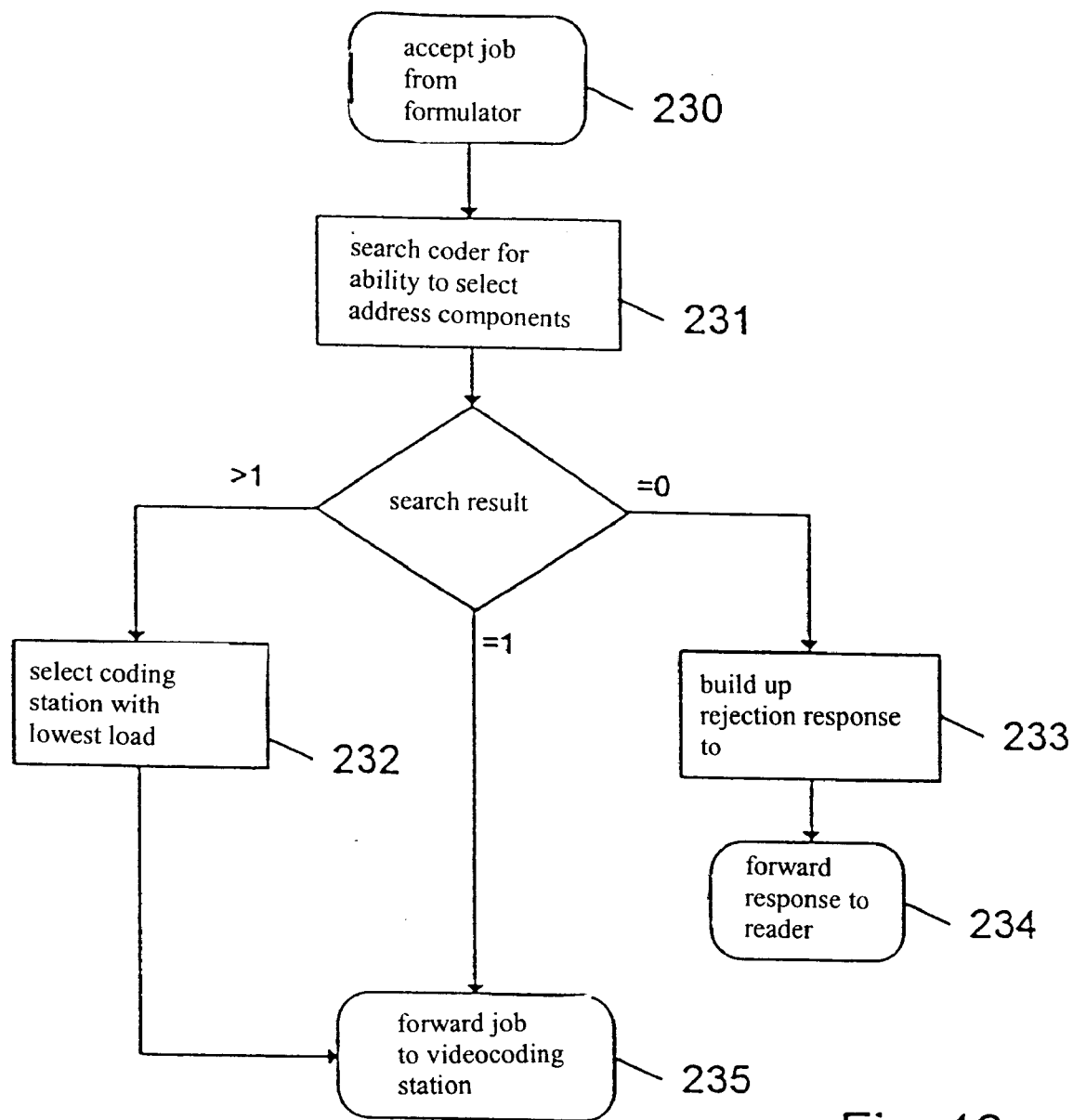
FIG. 12 is a flow chart for a job distributor during the address correlation.

The receiving station in the video-coding device 20, the job distributor, determines the type of job following the job acceptance 230, so as to conduct a search 231 in the coding station data bank 22 for the available coding station(s), having an operator with the necessary capability for solving this task and, if several video coding stations are detected, to select the one with the lowest load 232. Once this video coding station is determined, the job is transmitted to this station 235. If no video coding station available for solving this task is detected, a rejection response is formulated 233, which is forwarded 234 to the OCR processing unit 11 (see FIG. 12).

Figure 13:
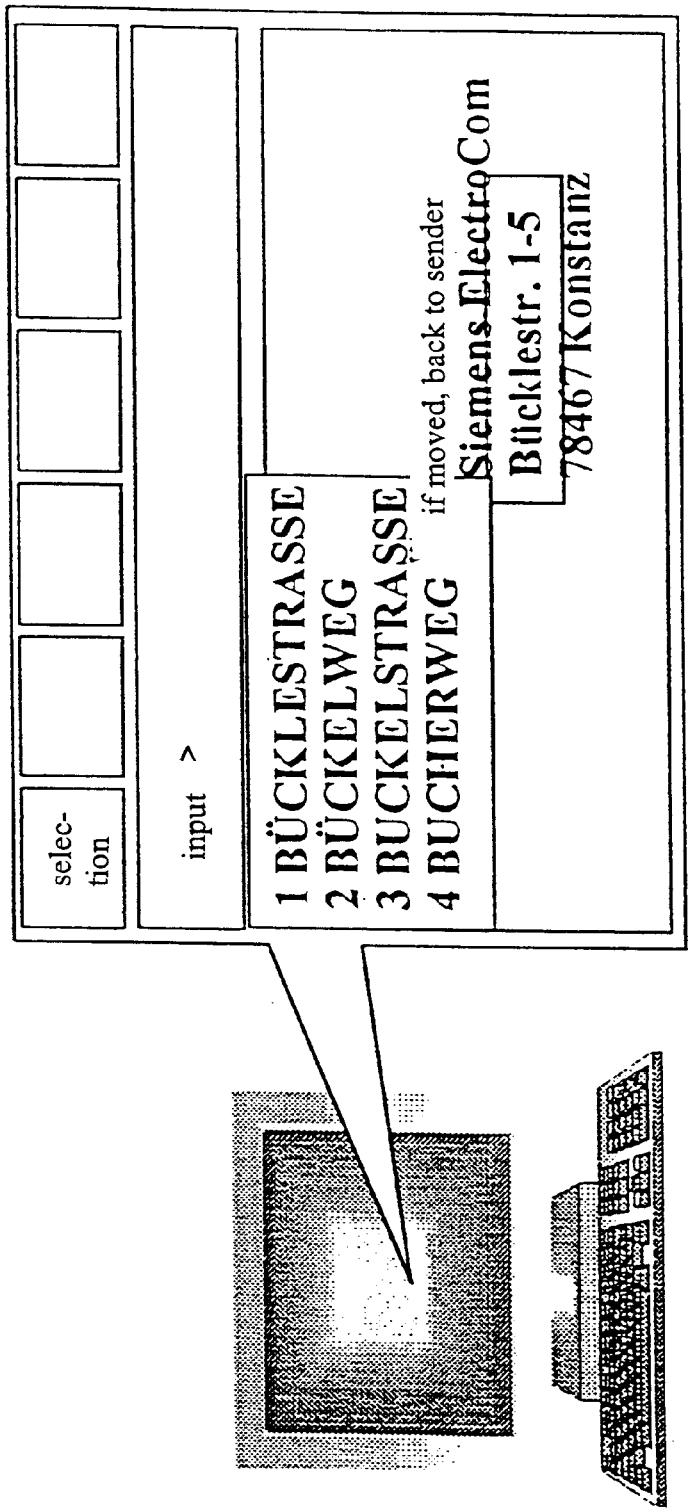
FIG. 13 is a representation of the job during the address correlation.

In the event that no suitable coding station is found, it can lead to an extension in the processing time, particularly for small coding systems with strongly diversified coding tasks, since the processing is stopped in that case and is resumed at a later time, once suitable coding stations are available. The coding operation itself must be designed to be as ergonomic as possible. FIG. 13 illustrates the graphic processing of data at the coding station. The input is via a standard keyboard.

The result of the coding input, the number for the alternative, is used to send the data for this alternative as result back to the reader. If the job contains the selection of different address components, the processing takes place during several steps.

The response processor for the job to decide deletes the alternatives for the processed address components and inserts the data from the result.

Figure 14:
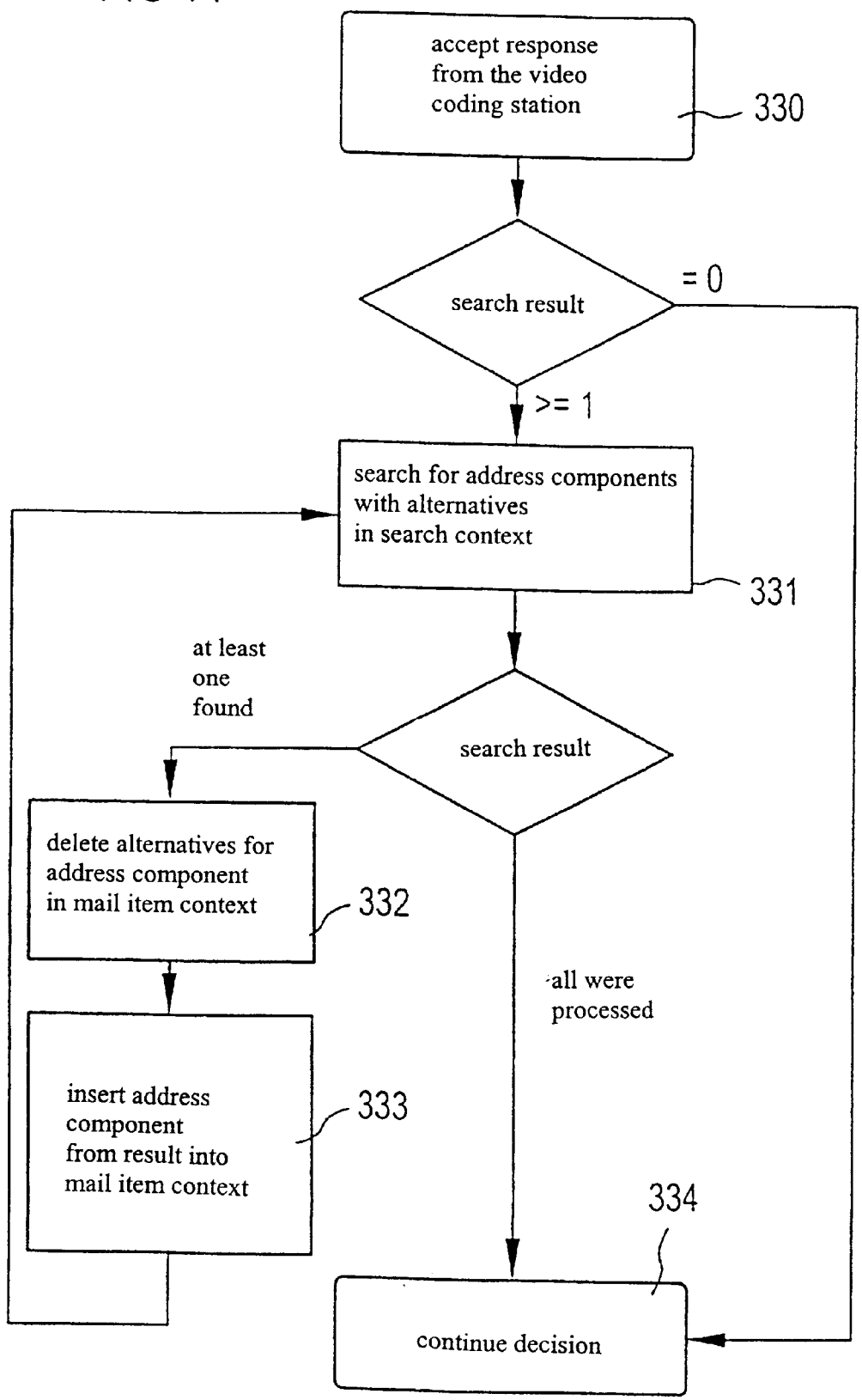
FIG. 14 is a flow chart for a response processor during the address correlation.

The flow chart in FIG. 14 describes the operating mode. Following acceptance 330 of the response from the video-coding device 20, a check is made to determine whether a response to the job exists. If that is not the case, the decision process is continued 334 in the OCR processing unit 20 and the processing is stopped. Once a successful video coding is carried out, the alternative address components are searched for 331 in the context memory 12 and are deleted 332. Following this, the address component from the video coding is inserted into the context memory 333 and the decision finding is continued 334 by issuing the result.

What is claimed is:

1. An automatic reading method for recognizing routing information on mail items with the aid of OCR processing of the recorded and stored images of the mail item surfaces containing the routing information, for which the automatic reading occurs during parallel and sequential process steps and is carried out through determination of regions of interest (1) (ROI), reading of stamps (2), line separation, segmenting, character and word recognition (4), address interpretation (5) with address analysis and address comparison (6) in an address data bank, carrying out a respectively following process step only if the preceding step yielded a clear result, and video coding routing information that was not identified clearly in a video-coding device (20) with video coding stations (7) having high-resolution monitors on which the transmitted, respective images with the routing information are displayed; and wherein in case of unclear results during respectively one of the automatic process steps (1–6) for reading, maintaining this process step in the current state, and based on the previously respectively determined clear and unclear results and intermediate results, automatically transmitting a job for video coding to one or several video coding stations (7), along with the information on unclear and missing results and the operations to be carried out for obtaining clear results during this process step, and replacing the ambiguous results with the clear coding results, to cause the paused process step for the automatic reading to be completed successfully and the following process step to then be started.

2. The method according to claim 1, including: during the video coding, displaying an image containing the routing information to be read, the task(s) to be solved and the results and/or partial results determined for this so far on the monitor of the respective video coding station (7).

3. The method according to claim 1 wherein in the video-coding device, each video coding station (7) is responsible only for a portion of the different video coding tasks, and further including distributing the coding tasks based on the job category and the responsible video coding stations for this, and based on the momentary workload of the video coding stations (7).

4. An arrangement for recognizing routing information on mail items, comprising:

an automatic OCR processing unit (11) with different function groups for determining the regions of interest, the line separation, segmenting, character and word recognition, address analysis, and address comparison with a connected address data bank, a context memory wherein the results, partial results, the status of the routing information determination and the input data are stored, and a video-coding device (20) with at least one video coding station (7) for the routing information that is not read clearly by the OCR processing unit (11) wherein the automatic OCR processing unit (11) is such that for unclear or missing intermediate results and/or results of the function groups, the function groups are respectively paused in the current state and, accordingly, a job message for video coding the tasks not clearly solved is triggered and sent to the video-coding device (20), and the OCR processing unit (11) continues the interrupted processing with the clear video coding results once these are received.

5. The arrangement according to claim 4, wherein the OCR processing unit (11) is connected to at least one job formulator (13), which receives the job signal for the respective reading function, searches the context memory (12) for the unclear or missing results of the respective reading function, formulates a job from the ambiguous results determined by the respective function group of the OCR processing unit (11) and the coding task, consisting of an image of the mail item surface with the routing information searched for and/or read, and transmits this job to the video-coding device (20).

6. The arrangement according to claim 5, wherein a job formulator (13) that is connected to the video-coding device (20) is connected downstream of each function group of the OCR processing unit (11).

7. The arrangement according to claim 4, wherein at least one response processor (14) that is linked to the video-coding device (20) is connected to the OCR processing unit (11) and inserts the response data from the video-coding device (20) into the context memory (12), deletes the unclear results, as well as transmits a signal for continuing the reading process to the OCR processing unit (11).

8. The arrangement according to claim 7, wherein a response processor (14) that is linked to the video-coding device (20) is connected to each module in the OCR processing unit (11).

9. The arrangement according to claim 4, wherein each video coding station (7) is responsible only for a portion of the coding tasks during the routing information determination and that the video coding stations (7) are connected via a job distributor (21) to the input of the video-coding device (20), wherein the job distributor (21) distributes the video coding tasks to the stations in accordance with the task responsibilities and workload status reports for the video coding stations (7), stored in a connected coding station data bank (22).

10. The arrangement according to claim 4 wherein a fast automatic online routing information reader is connected upstream of the automatic OCR processing unit (11), wherein the respective image with a reading job is transmitted to the automatic OCR processing unit (11) only if the reading result is unclear.

11. The arrangement according to claim 4, wherein several images with routing information to be determined are processed simultaneously.

* * * * *